United States Patent [19]
Palmer

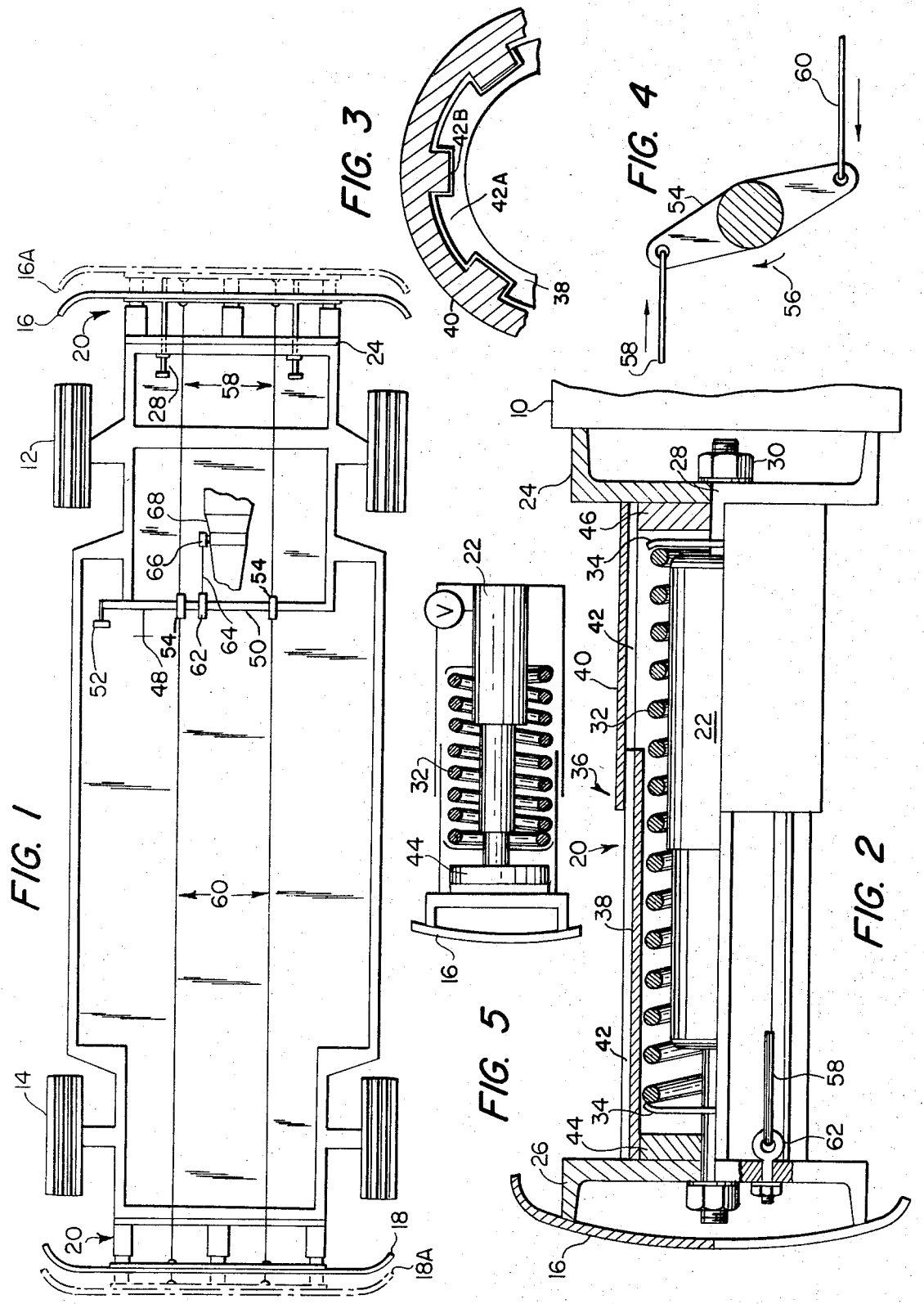

[11] 3,834,483
[45] Sept. 10, 1974

[54] SHOCK ABSORBING BUMPER SYSTEM
[76] Inventor: J. F. Palmer, Shanghai, Va. 23158
[22] Filed: Aug. 9, 1973
[21] Appl. No.: 386,926

[52] U.S. Cl. .................... 180/91, 180/95, 293/73, 293/86, 293/30
[51] Int. Cl. .................... B60k 33/00, B60r 19/06
[58] Field of Search ...... 293/30, 73, 85, 86, DIG. 2; 180/91, 95

[56] References Cited
UNITED STATES PATENTS

| | | | |
|---|---|---|---|
| 1,123,538 | 1/1915 | Imamura | 180/95 |
| 1,412,212 | 4/1922 | Miyagi | 180/95 |
| 1,558,390 | 10/1925 | Norman | 180/95 |
| 1,672,243 | 6/1928 | Blake | 293/73 |
| 1,925,461 | 9/1933 | Ridge | 293/86 |
| 2,628,118 | 2/1953 | Gunnels, Jr. | 293/86 |
| 3,677,595 | 7/1972 | Hamilton | 293/73 |

FOREIGN PATENTS OR APPLICATIONS
100,153   1/1962   Netherlands.................. 293/DIG. 2

Primary Examiner—M. Henson Wood, Jr.
Assistant Examiner—Robert Saifer

[57] ABSTRACT

A compound shock absorbing bumper system for automotive vehicles and the like, including a plurality of fluid operating cylinders surrounded by coil springs with the combination being housed and attached between the vehicle frame and bumper. The coil springs normally urge the bumper and cylinders to an extended operative shock absorbing position. Controls are provided in the vehicle to selectively move the bumper to a retracted position or release it for movement to the extended position. Means can be combined with the controls to simultaneously downshift the vehicle drive system.

4 Claims, 5 Drawing Figures

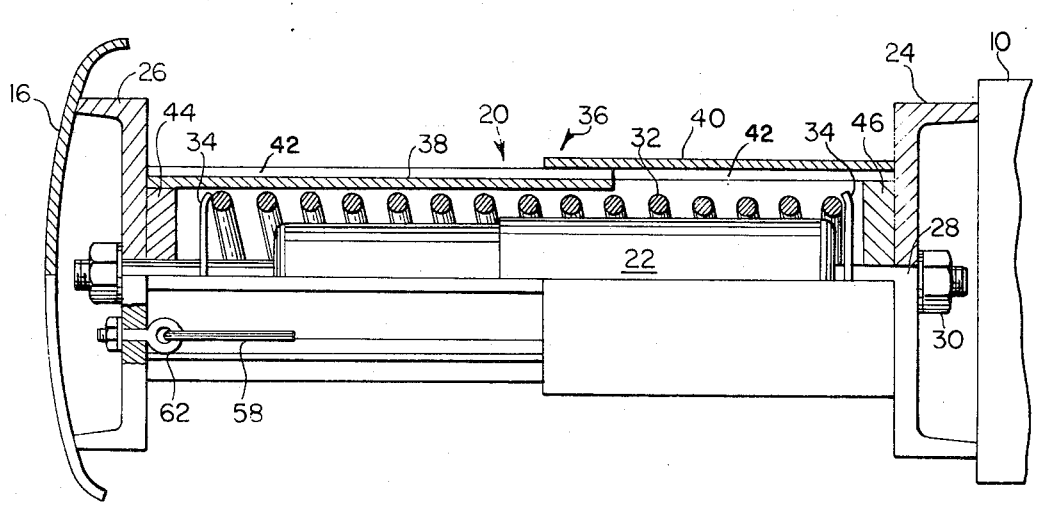

SHOCK ABSORBING BUMPER SYSTEM

BACKGROUND OF THE INVENTION

The manufacture and use of shock absorbing bumpers for automotive vehicles is of paramount interest in the automotive and vehicle safety fields. Numerous attempts have heretofore been made to provide a satisfactory solution to this problem, including optimum operation and reasonable costs. Such attempts have not been entirely satisfactory.

The present invention overcomes the defects and drawbacks of prior known systems.

BRIEF DESCRIPTION OF THE INVENTION

The invention is for a compound shock absorbing bumper system for automotive vehicles and the like incorporating a plurality of cylinders, such as hydraulic or air shock absorbers, with surrounding coil springs, the composite being operatively interconnected between the bumper and the vehicle frame. The cylinders are appropriately telescopically housed and means are used to prevent sagging and to minimize damage from lateral impacts. The springs normally urge the shock absorbers and bumper thereto to an extended position, and upon impact, the shock absorbers and springs serve to absorb impact forces as they move to a retracted position. Impact will cause air or other fluid to be compressed in the shock absorbers. Front and/or rear bumpers are interconnected in the overall system. Bumper release means are actuatable upon use of the brake pedal and the system further contemplates incorporating means to automatically shift gears down upon actuation to implement a slowing of the vehicle.

Additional objects and features of the invention will be more readily apparent from the following detailed description of an embodiment thereof when taken together with the accompanying drawings in which:

FIG. 1 is a schematic plan view of the present system as applied to an automotive vehicle;

FIG. 2 is a longitudinal cross section through a compound shock absorber as utilized in the system;

FIG. 3 is a fragmentary cross sectional view through a telescopic housing for a shock absorber disclosing aligning and strengthening means therefor;

FIG. 4 is a fragmentary view of a portion of a control system operable for extending or retracting the bumper and associated mechanism; and FIG. 5 is a schematic view of an air type shock absorber for use in the system.

Referring now in more detail to the drawings, there is schematically shown in FIG. 1 a vehicle frame 10 having the usual front wheels 12 and rear wheels 14. A front bumper 16 and a rear bumper 18 are operatively associated with the vehicle and interconnected with the frame 10 by compound shock absorbing units generally indicated at 20, the details of which will be described hereinafter. The system as a whole functions, under the control of the vehicle operator, to extend the bumpers 16 and 18 through and in conjunction with the shock absorber units 20 from the position indicated in full lines at 16 and 18 to an extended impact receiving position indicated respectively at 16A and 18A in broken lines. Extension of the bumpers to the extended position will be controlled by the vehicle operator as considered necessary or desirable during vehicle operation.

One compound shock absorbing unit is shown in greater detail in FIG. 2, and it will be noted from FIG. 1 that preferably there are three such units interconnecting the bumper with the vehicle frame across and at the front and rear of the vehicle, which provides additional stability with the structure preventing damage to the cylinders, avoiding lateral damage and providing for enhanced alignment. Each unit consists of a shock absorber 22 which can be of a hydraulic or air operated type and similar to shock absorbers presently in use. The shock absorber is interconnected to and attached between a lateral frame member 24 on the front or rear of the vehicle frame, and to a lateral channel member or the like 26 attached to the bumper 16 in a usual manner. The shock absorber is mounted between members 24 and 26 by rod 28, the ends of which are threaded and on which are engaged nuts 30. A coil spring 32 surrounds the shock absorber 22 and is held in position by means of plates 34 engaging at each end of and confining the spring, the plates being attached in any desired manner to the unit. The combination of shock absorber 22 and coil spring 32 is confined within a telescopic housing generally designated 36 which consists of a forward end 38 telescoped within a rearward end 40. As will be seen from FIG. 3, the members 38 and 40 of the telescopic housing are provided with interengaging splines or the like 42A and 42B, which serve to add strength to the unit, provide guiding and stability as also increased resistance to lateral impact forces thereon. End members 44 and 46 attached to channels 26 and 24 respectively and mounted within the telescopic sections provide limits of movement and abutments for the shock absorbing units. The rod 28 is slidable with respect to lateral frame member 24 as shown in FIG. 1.

The control system for the vehicle includes a normal brake pedal 48 schematically shown, for applying the vehicle brakes in a usual manner. Control of the bumper system is provided by a lever system including a rotatably mounted shaft 50 (FIG. 1) having a pedal 52 attached thereto and which is mounted so as to be operable with, or in tandem with, the brake pedal 48. Also attached to shaft 50 are double ended lever arms 54 in spaced positions on shaft 50 and adapted for rotation therewith upon depressing pedal 52 as indicated by arrow 56. Front rods 58 and rear rods 60 are respectively connected to the ends of arms 54 and at their opposite ends are connected through eye bolts 62 or the like to the respective members 24, 26 at opposite ends of the vehicle frame.

As previously stated, the coil springs 32 function to normally extend the shock absorbers and bumpers to the dotted line positions 16A, 18A. Upon impact, the shock absorbers 22 and springs work conjointly to absorb the impact forces on the bumpers as the bumpers are driven by the forces toward the vehicle frame and thereby cushion the impact forces against the vehicle. The controls are operable upon actuation of pedal 52 to retract the shock absorber units and bumpers to the retracted inoperative position shown in full lines at 16 and 18. Actuation to release to an extended position permits extension of the bumper assembly. Alternatively and preferably, a lever 62 is operatively connected to shaft 50 which is interconnected through lever 64 and connector 66 to the vehicle transmission 68, and upon actuation of pedal 52 to extend the bumper, serves to downshift the transmission gears from, for example, drive to low or second. This structure is only schematically shown, but could be similar in function and mechanism to a gear shift control such as normally used in vehicles having automatic transmissions. This utilizes the drag of the engine to slow the vehicle and in conjunction with the brakes will quite often stop the vehicle before it makes contact with an obstacle, thereby possibly preventing an accident.

The shock absorber as shown in FIGS. 1 and 2 is of a hydraulic usual type. In FIG. 5 an air cylinder type is shown wherein the air shock absorber has a two-way valve or can be provided with separate valves which will function upon extension to take in air and, under impact, will, due to air pressure buildup, vent under control and the function is the same as the hydraulic unit.

Manifestly, details of construction can be varied without departing from the spirit and scope of the invention as defined in and limited solely by the appended claims.

I claim:

1. In combination:
   A. an automotive vehicle;
   B. a vehicle frame;
   C. a vehicle bumper;
   D. a plurality of cylindrical fluid operating shock absorbers operatively interconnecting said vehicle frame and said vehicle bumper;
   E. a two part telescopic housing surrounding each said shock absorber with one part thereof connected to said frame and the other part thereof to said bumper;
   F. coil springs mounted in said housings and surrounding said shock absorbers, and normally urging said shock absorbers to extended positions and spacing said bumper from the vehicle into a position to receive an impact, said coil springs and said shock absorbers conjointly forming compound shock absorbers operable to absorb impact forces against said bumper while moving to a retracted position within said housings, with said surrounding housing parts telescoping one within the other;
   G. control means including a transverse shaft rotatably mounted on said vehicle, and having attached thereto:
      i. a lever arm, and
      ii. a pedal for selective rotation of said shaft by a vehicle operator;
   H. a rod connecting the end of said lever arm and said bumper, selective actuation of said pedal rotating said shaft and moving said rod, through said lever arm, to retract said compound shock absorbers and said bumper to an inactive position proximate said vehicle, or release said compound shock absorbers for extension of said bumper to extended position; and
   I. said telescopic housing parts having a plurality of mating guiding and strengthening splines thereon, coacting upon extension and retraction of said shock absorbers, said springs, and said housing parts.

2. The combination of claim 1, including end members mounted respectively in the front and rear parts of said telescopic housing, said end members being engageable by the ends of said shock absorbers and providing limits of movement and abutments for said compound shock absorbers.

3. The combination of claim 2, including lateral frame members attached respectively to said vehicle frame and said bumper, rods mounting said compound shock absorbers between said lateral frame members, said member attached to said vehicle frame having openings therethrough, said rods slidably extending through said openings thereby permitting rearward retraction of said bumper and retraction of said compound shock absorbers.

4. The combination of claim 3, including means interconnecting said control means and a vehicle transmission to cause, upon actuation of said control means to extend said compound shock absorbers and said bumper, simultaneous downshifting of said transmission for slowing of the vehicle.

* * * * *